March 17, 1953 C. W. HANSELL 2,632,162

PULSE MULTIPLEX RECEIVER

Original Filed Aug. 4, 1943 5 Sheets-Sheet 1

INVENTOR
CLARENCE W. HANSELL
BY [signature]
ATTORNEY

INVENTOR.
CLARENCE W. HANSELL
BY Harry Tunick
ATTORNEY

March 17, 1953 C. W. HANSELL 2,632,162

PULSE MULTIPLEX RECEIVER

Original Filed Aug. 4, 1943 5 Sheets-Sheet 3

INVENTOR
CLARENCE W. HANSELL
BY Harry Tunick
ATTORNEY

March 17, 1953 C. W. HANSELL 2,632,162

PULSE MULTIPLEX RECEIVER

Original Filed Aug. 4, 1943 5 Sheets-Sheet 4

INVENTOR
CLARENCE W. HANSELL
BY [signature]
ATTORNEY

INVENTOR
CLARENCE W. HANSELL.
BY Harry Tunick
ATTORNEY

Patented Mar. 17, 1953 2,632,162

UNITED STATES PATENT OFFICE 2,632,162

PULSE MULTIPLEX RECEIVER

Clarence W. Hansell, Port Jefferson, N. Y., assignor to Radio Corporation of America, a corporation of Delaware Original application August 4, 1943, Serial No. 497,315, now Patent No. 2,478,920, dated August 16, 1949. Divided and this application May 28, 1949, Serial No. 96,123

18 Claims. (Cl. 343—203)

The present invention relates to improvements in radio broadcasting systems, and is a division of my parent application Serial No. 497,315, filed August 4, 1943, now U. S. Patent 2,478,920, granted August 16, 1949.

In employing conventional methods of communication involving the use of continuous waves, it has been found that greater and greater difficulties are encountered in obtaining good transmitter and receiver frequency stability as higher and higher frequencies are utilized. When it is attempted to carry conventional methods up to frequencies exceeding say 150 megacycles, it is found that the receiver circuits preceding the final detector must be very broad if the received signal is to be kept within the receiver pass band. Since very high radio frequencies are limited in range to not much more than optical distances, equipment to utilize them must be inexpensive or it cannot compete with other forms of communication for many applications. Therefore, the expenditure required to apply frequency control of extreme precision cannot be justified in such cases.

Because receiver pass bands of conventional receivers must be made very broad, to allow for frequency variations of transmitters and receivers, a relatively great amount of noise is admitted. The noise, in turn, either limits the communication range or requires use of far greater transmitter power than would be required if frequency stability were not a problem.

Long study and development of means to obtain frequency stability has indicated that this line of attack has long since entered the phase of rapidly diminishing returns per unit of development and construction cost. Therefore, some other approach to the problem has been indicated.

The present invention overcomes the foregoing difficulties by applying pulsing methods to broadcast communication at the extremely high radio frequencies. In the pulsing communication system of the invention, only a relatively narrow modulation frequency band is required, and the transmitter power is radiated in relatively short, widely spaced, pulses of carrier current with power level during pulses increased in inverse proportion to the percentage time occupied by the transmitted pulses. If the pulses occupy say 1% of the total time, then the power radiated during pulses may be 100 times the amount of power obtainable continuously from continuous wave equipment of comparable size and cost. The pulses are received with a receiver having means to make itself responsive to received power only during time periods when transmitted pulses are due to arrive. This may be accomplished by synchronizing means similar in function to those already developed for television. In this way the effects of interference from other transmitters and of noise present during time periods between periods assigned to pulses of particular transmitter may be eliminated. Thus, pulse timing selectivity is substituted for frequency selectivity and, as a consequence, loss of signal to noise ratio due to wide receiver pass bands, necessitated by radio carrier frequency stability, becomes a relatively minor factor.

In the system of the invention, modulation may be applied by modulating the amplitude, length or timing of the pulses. I prefer to modulate the timing of the pulses because of certain advantages possessed by systems employing this method. One advantage is that the average transmitted power is substantially constant and unaffected by the presence or absence of modulation. In this system, where the pulse amplitude is constant, it is possible, by means of thresholding and limiting amplifiers at the receiver, to greatly reduce the effects of noise so long as the amplitude of pulse currents is more than twice the peak amplitude of noise. In the receiver, the rectified, amplified, thresholded and limited received pulses are delivered to suitable demodulating circuits.

In the use of pulsing systems, there are two methods by which short pulses may be transmitted. One is to let the transmitter feed relatively constant power to a flywheel circuit and then to take power from the circuit in pulses by means of some sort of momentarily applied coupling between the flywheel circuit and the antenna. This permits obtaining peak pulse power nearly inversely proportional to the percentage time occupied by the transmitted pulses. Such an arrangement is described in my copending application Serial No. 371,865, filed December 27, 1940, now U. S. Patent 2,381,444 granted August 7, 1945. Unfortunately, the flywheel circuit and momentary coupling arrangement is at present applicable at only rather low radio frequencies and low pulse rates because, up to the present, there are not commercially available coupling circuits and apparatus which can be controlled as rapidly as desired. However, there have been a number of experiments made which indicate that such a coupling can be provided by further development. A second method involving pulse transmission is to apply much more than normal potentials and currents to transmitter output tubes in short relatively widely spaced pulses. By this means the instantaneous power dissipation in the tubes may be increased approximately in inverse proportion to the percentage pulse time. Many types of vacuum tubes, particularly those with thoriated or oxide coated cathodes, are capable of carrying much higher electron currents than is normally permitted by heating in continuous wave service. Over a large range of potentials and currents, above rated values, many tubes will withstand pulse operation at peak power outputs enormously greater than the rated continuous wave output. In general, the operating efficiency of the tubes tends to increase with increasing potential and current because the tube impedance decreases while the load impedance may be considered constant. As an example, a tube operating at 50% anode circuit conversion efficiency and delivering an output of one watt on continuous waves might instead be pulsed with 10 times greater instantaneous anode current, which would result in 10 times greater output current and potential or about 100 times greater output power.

The broadcasting system of the present invention employs a plurality of interconnected sound broadcasting stations each arranged to transmit the same pulse frequency, on the same radio carrier wave frequency, but at different times. The duration of the pulses of radio frequency energy is made to be short compared to the time intervals between them, so that the different transmissions do not coincide in time even when the timing of pulses from individual transmitters is being modulated. The pulse frequency is chosen to be higher than the highest modulation frequency, and in the case of speech modulation as contemplated herein, this pulse frequency might be 20,000 to 40,000 pulses per second. I will assume in the following that it is 25,000 per second.

By way of example assume that, in a given city or service area it is desired to establish four radio broadcasting transmitters, each handling a different program. Assume further that, if conventional amplitude modulation methods were used, frequency instability between transmitter and receiver, plus the frequency bands occupied by modulation, would require the use of receiver pass bands which are 2,500,000 cycles wide. According to prior broadcasting practice, the four transmitters would then be assigned frequency channels spaced 2,500,000 cycles apart and would require a total frequency band of 10,000,000 cycles per second.

The value of 2,500,000 cycles required band width for the receiver is arrived at as follows:

In the present standard broadcast band, ranging in frequency around 1,000,000 cycles per second, transmitting stations are placed about 10,000 cycles apart. At this frequency, the relative frequency stabilities between transmitters and receivers is adequate. Perhaps low priced receivers may be said to hold correct tuning within say plus and minus 1250 cycles or 0.125% of correct value, which may be considered good enough, considering that the listener can retune occasionally. For this same percentage accuracy in holding correct tuning, we would expect the variations to be plus and minus 12,500 cycles at 10,000,000 cycles, 125,000 cycles at 100,000,000 cycles and 1,250,000 cycles at 1,000,000,000 cycles. The required band width at 1000 megacycles would thus be 2,500,000 cycles. This value of 2,500,000 cycles as the band needed at the receiver to keep a 1000 megacycle pulse transmitter tuned is a reasonable one and is consistent with current experience, considering the fact that 1000 megacycle transmitters and receivers cannot at present benefit from years of development on frequency control at the lower frequencies. If each low priced receiver must be about 2,500,000 cycles wide to keep 1000 megacycle transmitters tuned in, then the transmitters in any one area must, of course, be spaced 2,500,000 cycles apart and four such transmitters would occupy a total band of 10,000,000 cycles.

In accordance with the present invention all transmitters will be placed on the same radio carrier frequency (for example, 1000 megacycles), within some reasonable tolerance, but will share time in accordance with the principles of time division multiplex systems. Thus the transmitters will be assigned successive time positions within which they are allowed to operate and each transmitter will operate in pulses repeated at the rate of say 25,000 pulses per second, corresponding to an average time of 40 microseconds between successive pulses of each transmitter. The successively repeated time intervals assigned to each transmitter are then a maximum of 10 microseconds in length. However, I propose that the length and wave form of pulses produced by each transmitter be such as to occupy nearly the whole frequency band of 10,000,000 cycles less 2,500,000 allowance for frequency instabilities. They may, for example, be nominally 0.25 microsecond in length and have a wave form as nearly rectangular as the remaining 7,500,000 cycle frequency band will permit. Under these conditions pulses of each transmitter will occupy 0.625% of the time and the pulse power output of each transmitter may be about 160 times the power output of a continuous wave transmitter of equivalent size and equal average power output. Each transmitter may then be modulated in such a manner as to superimpose the modulation upon the pulses. We might modulate the amplitude or the length of the pulses but I prefer to modulate the timing, or phase, of repetition of the pulses, while maintaining the amplitude and length of pulses constant. In the example given, the timing of pulses from each transmitter may be modulated from the average time position by as much as plus or minus 4.75 microseconds but, in practice, we may set nominal limit of plus and minus 3.5 microseconds, or less, for reasons which will be apparent later.

To receive the waves from each transmitter independently of the others, in the example of the invention given, a receiver will be used in accordance with the invention which is responsive for time periods equal to or somewhat less than the operating time periods assigned to each transmitter, repeated in synchronism with the pulses of a selected transmitter. During responsive periods, received power, first heterodyned to lower frequencies, then frequency band selected, and amplified threshold and limited, will be rectified to produce direct currents in the form of nearly rectangular wave form pulses which are then passed on to a demodulator suitable for demodulating the type of modulation superimposed on the pulses. The resulting demodulated output power is obtained at modulation frequencies which may be further amplified and utilized in the usual ways. Thresholding and limiting devices at the receiver are used to very greatly reduce the effect of all noise power having lesser amplitudes than half the pulse peaks.

By "pulse peaks" I mean the value of the signal pulse peaks in the circuits before thresholding and limiting. It will be evident that if the threshold is set high enough to cut off noise peaks then the signal pulses must be higher than the noise peaks to get through. However, when the pulses are present in the circuits they are modulated by the noise to an extent equal to the maximum of the noise peaks. The minimum of the dips in pulse amplitude due to noise should not reduce the current through the limiter. Since limiting must always be at an amplitude above the threshold amplitude, it follows that the signal current must be not less than twice the peak noise amplitude to obtain the full effect of thresholding and limiting.

Compared with the conventional continuous wave amplitude modulation system of the example, such a system provides an overall signal to noise power ratio improvement of about 160 to one on each channel, in the receiver circuits prior to thresholding, limiting and demodulation, for a given size of transmitter apparatus, without an increase in the total frequency band required by the four transmitters. As a result of thresholding and limiting, when noise levels are not too high, the final improvement in signal to noise ratio may be much more than 40 to 1. Thus, four 50 kilowatt transmitters may be made the equivalent or better in results than four 8000 kilowatt amplitude modulated transmitters by means of the invention, under the conditions assumed.

To explain and clarify the reasons for a signal to noise ratio improvement, as compared with the conventional amplitude modulation system, it may be noted that the necessity for widening the receiver pass band beyond the minimum required for modulation, in order to allow for frequency instabilities, results in a proportional increase in both the R. M. S. and the peak values of combined radio frequency noise currents at the input to the demodulator of the amplitude modulation receiver. As a result, masking of the useful modulation by the noise takes place at nearly proportionally higher signal current power levels. In other words, widening the receiver pass band raises the mean power threshold level which must be exceeded by the signal carrier current power before the useful modulation can come through the demodulator with small enough mutilation to be useful. This is the same kind of phenomenon as that which causes the "improvement threshold" noise level to rise in frequency modulation receivers when the receiver pass band is widened.

In the pulsing system of the present invention, unlike frequency modulation systems, the increased noise power at the input to the receiver demodulator, as the pass band is widened, is balanced by a corresponding increase in transmitter peak pulse power. Therefore, so long as the transmitted pulses are decreased in length to match the increased receiver pass band, and the pulse peak power increased to correspond, there is no rise in the mean or average improvement threshold power level as the receiver pass band is increased. Thus, in marked contrast to frequency modulation systems, there is no increase in the minimum required average power level to work through the noise as the frequency band occupied by the system is increased.

Thresholding and limiting are fully effective in bringing about a great improvement in final signal to noise ratio in the output of the receiver of the present invention so long as peak noise currents do not reach above the threshold level during time intervals when the transmitter power is off, or reach below the limiting level when the transmitter power is on. In other words so long as noise is not strong enough to affect the envelope of the carrier current pulse wave form, after thresholding and limiting, then the effect of all noise currents is very greatly reduced. Under these conditions the only effect of noise is to cause slight variations in the exact timing of transition from zero to maximum, or maximum to zero in the envelope wave form of current delivered to rectifier which converts carrier current pulses into direct current pulses in the receiver.

It will be noted that, so long as power from the various transmitters does not arrive at the receivers during overlapping time periods within which the receiver is open, there can be no interference between transmitters. Even if energy from an undesired transmitter should arrive simultaneously with that of a desired transmitter while the receiver is open, no substantial interference need result so long as the combined currents from the undesired transmitter and noise do not reach half the amplitude of current from the desired transmitter. Under this condition the thresholder and limiter suppress nearly all interference.

In practice, energy of undesired transmitters might occasionally arrive simultaneously with energy of a desired transmitter due to the influence of reflections of energy over longer paths, resulting in arrival of time delayed energy at the receiver, or due to arrival of energy from distant stations operating in the same frequency band but located in other service areas. However, the amount of this energy will usually be much less than that from the desired transmitter so that its effect will be small.

In the practice of the invention, it is important to locate the time sharing transmitters which are in the same service area and on the same frequency as nearly as possible at the same location so that they have nearly equal time delays to all receivers in their service area. Otherwise, existence of unequal time delays may result in interference, or in loss of permissible pulse time swing due to modulation.

The preferred arrangement is to load all the transmitters on the same antenna in which case it is economical to use a higher and more directive antenna which will enlarge the service area of all transmitters. This loading of all transmitters on one antenna requires the use of special coupling and uncoupling circuits, operated synchronously with the transmitter pulses, which will be described later.

A more detailed description of the invention follows, in conjunction with a drawing, wherein.

Figure 1:
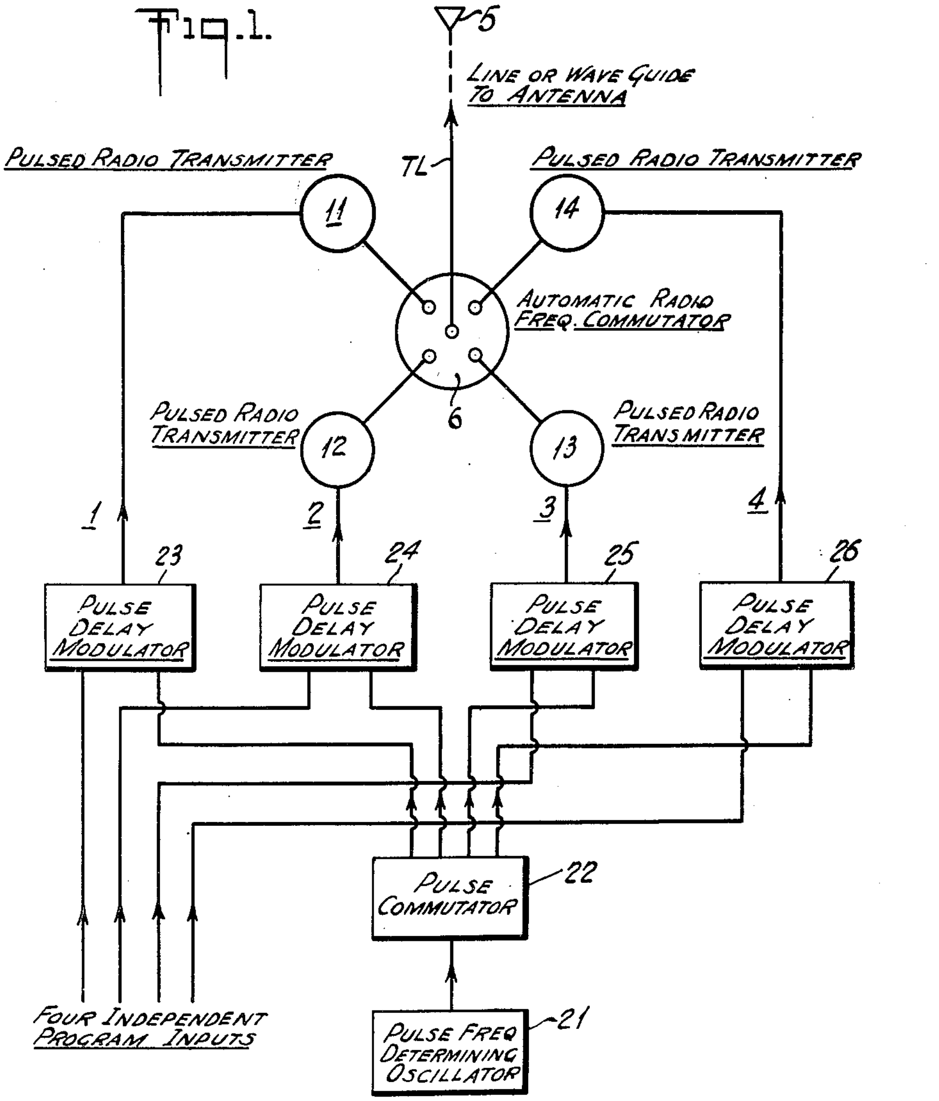
Fig. 1 illustrates a radio broadcasting system having a plurality of interconnected broadcasting transmitting stations operating in accordance with the invention.

Referring to Fig. 1, there is shown, in block diagram, an arrangement of four pulse type radio broadcaster transmitter stations 1, 2, 3, and 4, each modulated by an independent sound program and all locked together so that their pulses occupy different time periods. All four transmitters are loaded on a common transmission line TL and associated transmitting antenna 5 through an automatic radio frequency current commutator 6 which, in effect, connects each transmitter to the line TL extending to the antenna system only while that transmitter is providing pulse power output.

The four transmitters include apparatus labeled respectively 11, 12, 13, and 14 for converting pulsed direct current power to high frequency power. These converters may be of the magnetron-oscillator type, particularly at frequencies above 500 megacycles or they may be triode oscillators or amplifiers, particularly at frequencies below 500 megacycles. Each comprises associated rectifiers and pulse keyers or modulators well known in the art, particularly in radar systems.

To determine the pulse timing, there is a pulse frequency determining oscillator 21 which is common to all transmitters and which controls the operation of a pulse commutator 22 out of which come pulses spaced in time according to the desired average time spacing between pulses from the transmitters 11, 12, 13, and 14. Pulses from unit 22 are delivered in succession to pulse delay modulators 23, 24, 25, and 26. There is one such pulse delay modulation for each broadcasting station, and the functions of these pulse delay modulators are to modulate the timing or phase of the output pulses from each of transmitters 11, 12, 13, and 14 in accordance with its own particular program modulation.

In order that there may be provided, at the receiver, some means for causing the receiver to choose, automatically, the desired synchronization needed for selecting one transmitter from the other according to predetermined receiver adjustments, the pulsing of the four transmitters is timed as though there were to be five transmitters pulsing successively at uniform time intervals, but pulses of the fifth transmitter are omitted. This pulse timing relation is illustrated in Fig. 2, for the condition of no modulation.

Figure 3:
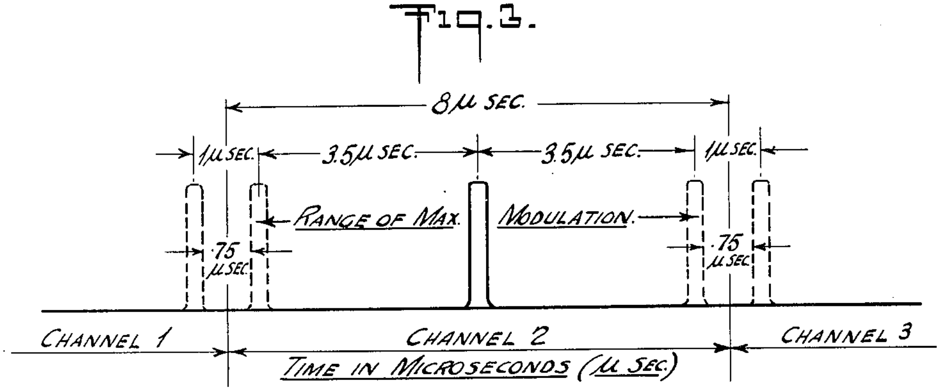
Fig. 3 shows the range of timing relations for the transmitters in greater detail than in Fig. 2.

In Fig. 3 there is illustrated more in detail the conditions of operation of the pulses in channel 2, which is typical of all the channels. The time interval assigned to the channel, at each repetition, is 8 microseconds and it is assumed that the transmitted pulse is 0.25 microsecond in length. The maximum degree of modulation of the pulse corresponds to changing its timing by plus or minus 3.5 microseconds. This leaves a time interval of 0.75 microsecond for the receiver to switch its gating system on or off, for choosing pulse power of only one transmitter at a time. In practice, the range of modulation and the available time interval for switching the receiver may, of course, be adjusted for best results with currently available quality of equipment.

Figure 4:
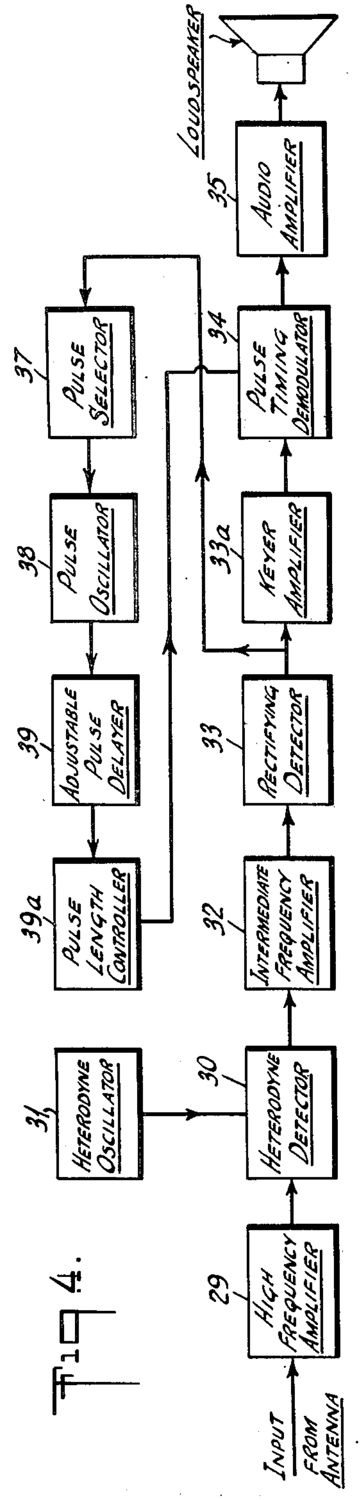
Fig. 4 is a block diagram of a receiver for use in the system.

For selectively receiving and demodulating the pulses of the transmitters of the system of Fig. 1, I employ a gated receiver illustrated in the block diagram of Fig. 4. This receiver comprises a high frequency amplifier 29 followed by a heterodyne detector 30 supplied by heterodyning current from heterodyne oscillator 31. Intermediate frequency output energy from detector 30 is amplified and limited in frequency band width in I. F. amplifier 32 after which it is rectified in pulse rectifier 33 passed by keyer amplifier 33a, and demodulated in demodulator 34. The output from demodulator 34, at audio frequencies, is then amplified in audio frequency amplifier 35 and delivered to loudspeaker 36.

Figure 2:
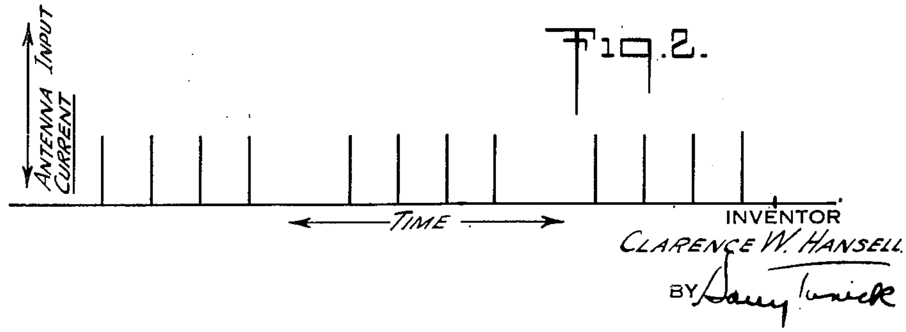
Fig. 2 shows the pulse timing relations of the four transmitters for the condition of no modulation.

A portion of the output from pulse rectifier 33 is delivered to the pulse selector 37 whose function is to select a particular timing relation according to the empty time intervals illustrated in Fig. 2. Output from the pulse selector 37 is utilized to synchronize pulse oscillator 38 which pulses once for each cycle of rotation of the channels, in this case, according to the example given, at a rate of 25,000 pulses per second.

Output from oscillator 38 is passed through manually adjustable pulse delayer 39 and pulse length adjuster 39a by means of which any desired one of the four transmitters may be selected for reception and demodulation. Output from pulse delayer circuit and the pulse length adjuster 39a is used to key on and off the coupling from pulse rectifier 33 through keyer amplifier 33a to pulse demodulator 34, to render it operative for the time intervals occupied by only one transmitter, excluding time intervals occupied by the other transmitters.

In Figs. 1 and 4 some of the indicated parts of the system comprise components for performing functions which are components already known in the art and for which there are known alternative means available. However, in order to facilitate the practice of the invention, I will show means for accomplishing the less well known functions and give references to prior disclosures of suitable means.

Figure 5:
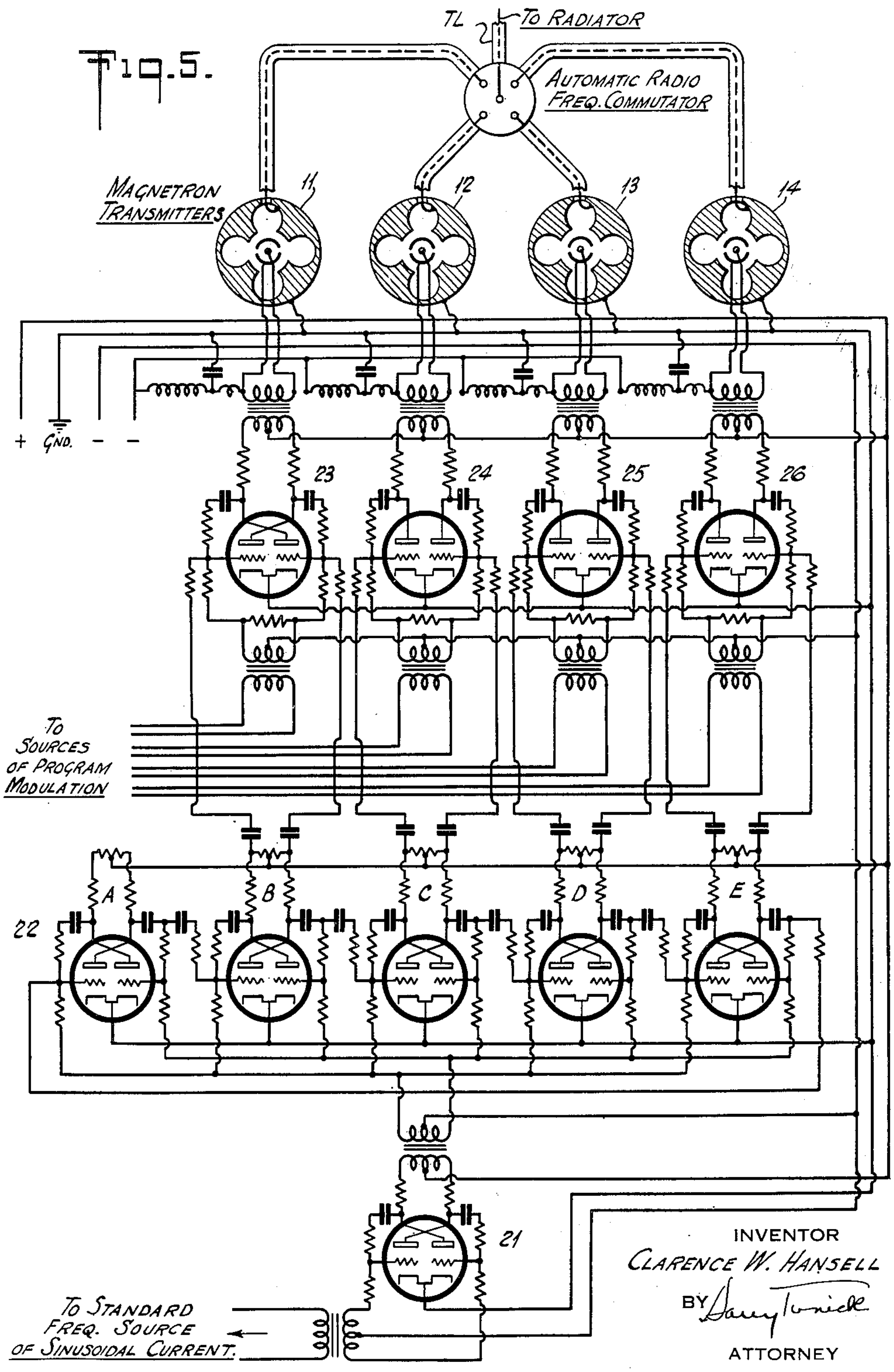
Fig. 5 illustrates, more or less in detail, circuit arrangements corresponding to the transmitting system of Fig. 1.

In Fig. 5, I have shown a simplified circuit diagram of the transmitting system which is illustrated in the block diagram of Fig. 1. At 21 I have shown what is sometimes called a multivibrator oscillator which operates at a frequency equal to the combined pulse rates of the several transmitters plus the missing pulse of Fig. 2. If each transmitter is to pulse 25,000 times per second, and there are four transmitters, as illustrated, then oscillator 21 will operate at 25,000×5 or 125,000 cycles per second. This multivibrator is so designed and adjusted that pulses of current through each anode to cathode circuit of the two triode electrode structures occupy half of the time. Thus, the oscillator flops from one unbalanced condition to the other 50,000 times per second, remaining in each condition for half of the time.

In those cases where great precision of pulse repetition rates is desired, the multivibrator oscillator 21 may be coupled to some standard frequency source of sinusoidal current, such as a piezo-electric quartz crystal controlled oscillator, as indicated, in order that the multivibrator oscillations may be synchronized by the standard frequency current. It is expected that commercial broadcasting systems serving many people will utilize this precise frequency control, whereas equipment for less important services will omit the precision pulse frequency control.

In Fig. 5, immediately above oscillator 21, is the pulse commutator 22. This commutator is comprised of five multivibrators A, B, C, D, and E of a special kind which spend much more time in one temporarily stable unbalanced condition than in the other. In the present example, each oscillator will operate at a frequency of 25,000 cycles but will spend four times as much time with current through one anode circuit as is spent with current through the other anode circuit. This inequality of time spent in one condition or the other is obtained by suitable selection and adjustment of the resistors and condensers associated with the tubes.

All of the five multivibrator oscillators of the pulse commutator 22 of Fig. 5 are coupled together in such a manner that, going from left to right and then back to the beginning, each oscillator is synchronized by the one preceding. Thus, while all the oscillators are most of the time unbalanced in one direction there is a sort of wave of opposite unbalance running around the five oscillators in their cascaded or closed loop coupling arrangement. The speed of this wave is determined first by the circuit constants in the circuits of the commutator and then more exactly by oscillator 21 in such a manner that each successive cycle of oscillation in oscillator 21 causes flipping of a next succeeding multivibrator around the coupled group of oscillators 22.

As a consequence of the successive flip-flopping of the oscillators in pulse commutator 22, the pulse delay modulators 23, 24, 25, and 26 are each supplied with successive pairs of pulses which mark the beginning and end of the time intervals assigned to each of the four corresponding transmitters. The first pulse of each pair, say to modulator 23, throws the modulator 23 to one condition of unbalance and the second pulse throws the unbalanced back again, if the modulator circuit has not already thrown itself back.

The multivibrator pulse delay modulator 23, however, is so adjusted that, in the absence of modulation, it throws itself back half way between the two pulses from commutator system 22. This throwback governs, or provides, pulses delivered to magnetron transmitter 11 to make it deliver to coaxial transmission line TL a short but powerful pulse of radio frequency power.

If modulation frequency energy is coupled into modulator multivibrator 23, as shown, then the time taken by the circuit to throw itself back is modulated accordingly and we thereby produce modulation of the timing of pulses from transmitter 11. The other magnetron transmitters 12, 13, and 14 produce pulses which are similarly modulated.

An outstanding virtue of the arrangement of Fig. 5 is that none of the modulators 23, 24, 25, and 26 can deliver pulses to cause operation of its particular transmitter until after it receives the first one of the pair of pulses to each, from commutator 22, and similarly none can cause operation of its transmitter any later than the second one of the pair of pulses. Thus there is no possibility of pulses of any one channel falling into time periods reserved for another channel. Instead, if excessive modulation input is applied to any one channel, the peak modulation will be strictly limited to keep each pulse transmitter in its own assigned time period. Thus, while overmodulation can result in distortion in each channel it cannot cause interference between channels.

In Fig. 5 the magnetron transmitters 11, 12, 13, and 14 are of the type described in my United States patent application Ser. No. 470,768, filed December 31, 1942, now U. S. Patent 2,409,038, October 8, 1946. Only certain essential elements of these magnetrons have been shown for the sake of simplification of illustration. The field coil for producing the magnetic field has not been shown. The anode, it will be noted, is of the multi-target cavity resonator type, which is coupled to an output set by means of a loop in one of the cavity spaces. However, it should be understood that any other type of pulse transmitter in which radio frequency output pulses are produced in response to input control pulses may be used. Such transmitters are well known in radar and similar systems.

Figure 6:
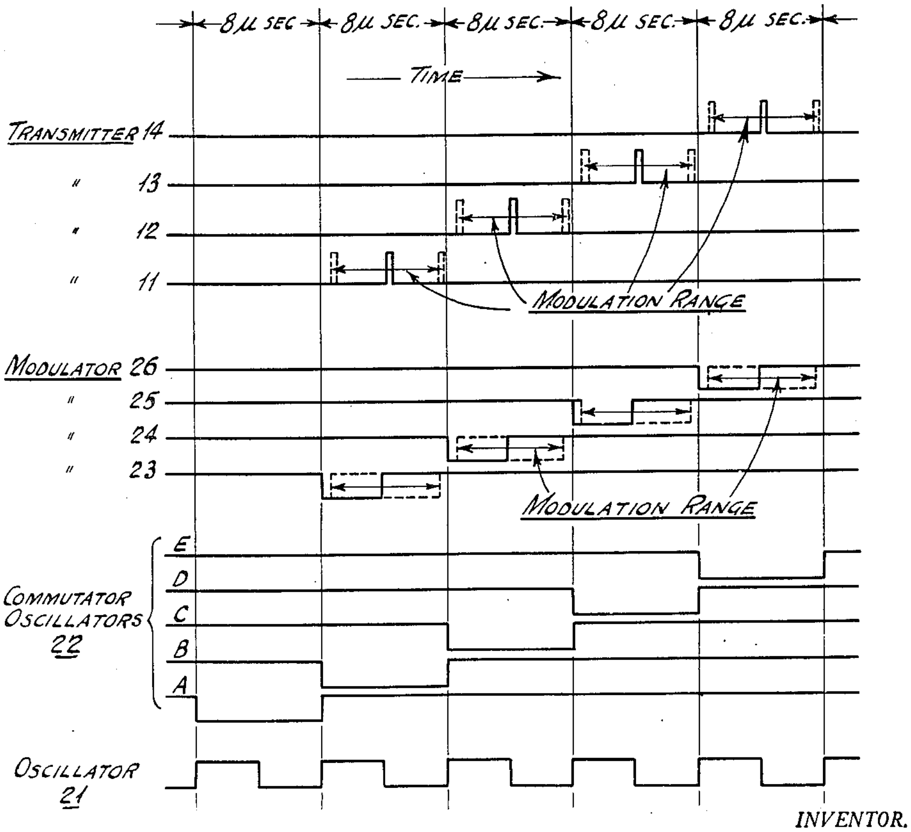
Fig. 6 shows the wave forms and timing relations of currents in various parts of the system of Fig. 5.

Fig. 6 graphically shows the wave form of currents in the several vacuum tube circuits of Fig. 5 with respect to time, including the effect of modulation, in order that the operation of the system of Fig. 5 may be better visualized.

Figure 7:
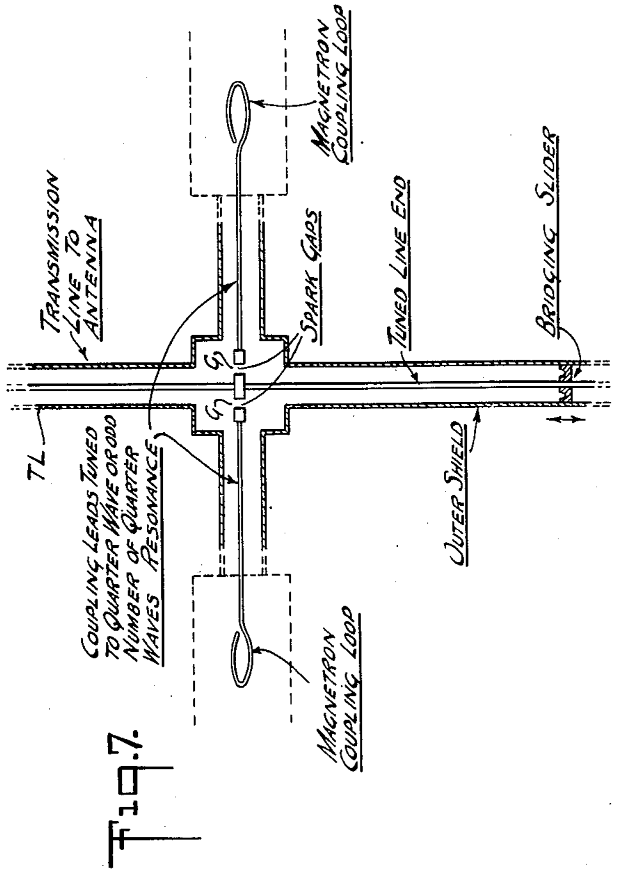
Fig. 7 illustrates in greater detail the radio frequency commutator arrangement of Figs. 1 and 5.

The automatic radio frequency commutator indicated in Figs. 1 and 5 for coupling the several transmitters successively to the common transmission line to an antenna is illustrated in greater detail in Fig. 7. In this arrangement the inductively coupled output lead of each magnetron is separated from the antenna transmission line TL by a spark gap G. Each coupling lead is adjusted in length to make it resonant for the open circuit condition of the spark gap. As a result, when the magnetron is operating, a very high radio frequency potential may be built up across the spark gap, if necessary, to cause the gap to arc over. This gap spark over potential may be large compared with the potentials developed at any time on the loaded transmission line TL to the antenna.

At the same time that one magnetron is delivering pulse power through its particular spark gap, the other magnetrons are inactive and, due to absence of electron space charge, are somewhat mistuned from the transmitted frequency. As a consequence, the lead to each inactive magnetron presents a relatively high impedance at its spark gap and capacity coupling across the gap tends to guild up potential at the end of the lead to reduce the potential across the spark gap. This, combined with the fact that the loaded transmission line does not rise to a very high potential while being fed with power from any one magnetron tends to discourage sparking across the gaps associated with the inactive magnetrons. Thus under suitable conditions of gap length, gas pressure in the gaps, and circuit adjustments, only that gap in circuit with an active magnetron will be short circuited and nearly all the pulse power output of an active magnetron will be delivered to the antenna transmission line TL.

For still more positive commutation, obtainable with less care in adjustment, direct current pulse discharges may be superimposed on the radio frequency discharges in the spark gaps but this, of course, requires more equipment complication.

There are many detail circuit arrangements which may be utilized to perform the functions indicated in the various units of Fig. 4. One detail arrangement is shown in the schematic diagram of Fig. 8 in which the parts have been numbered to correspond with the numbering in Fig. 4.

Figure 8:
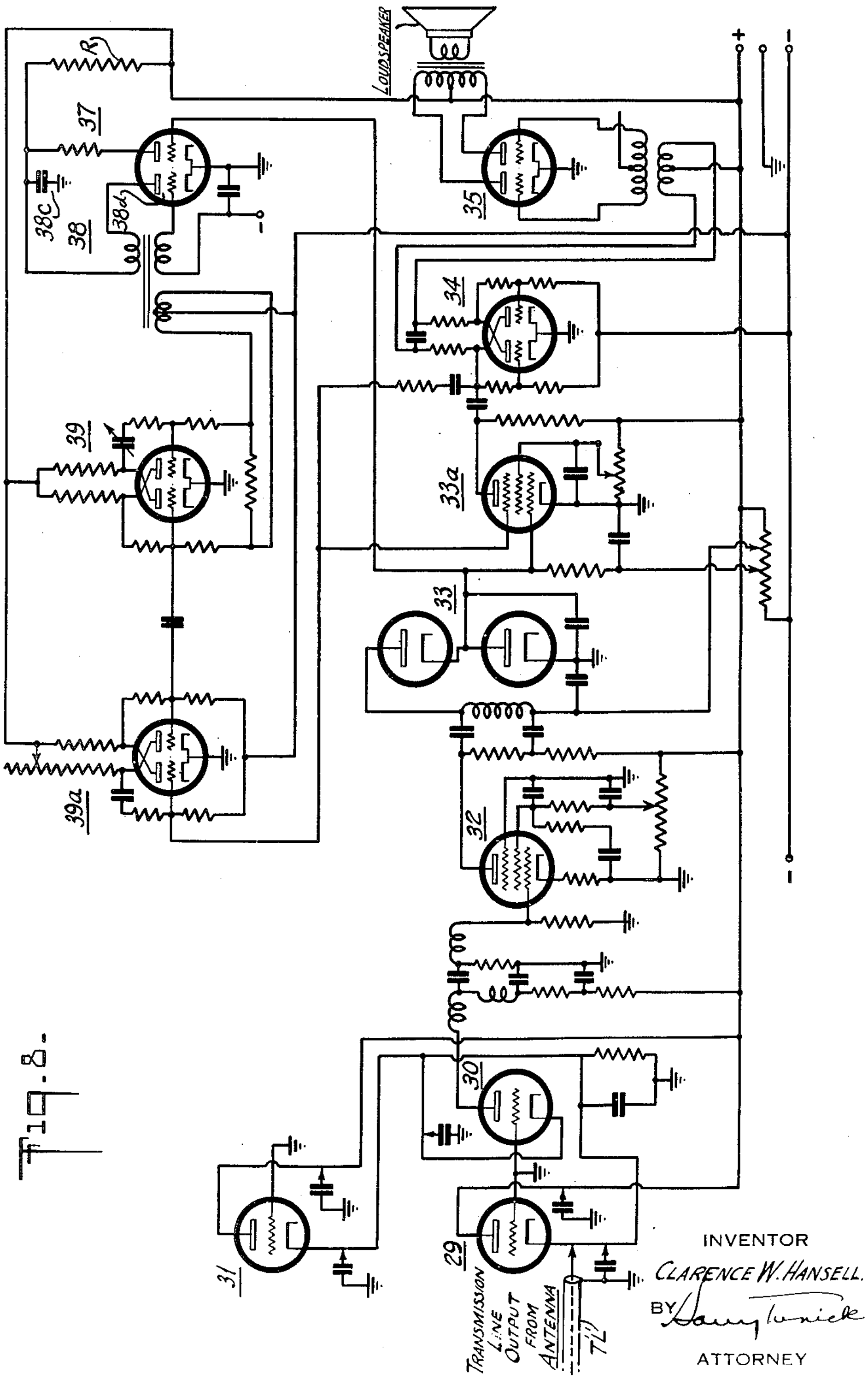
Fig. 8 illustrates more or less in detail circuit arrangements which may be used for the receiver of Fig. 4.

Referring to Fig. 8, received signal power from the receiving antenna is delivered over a transmission line T'L' to high frequency amplifier 29, the transmission line being terminated in such a manner as to deliver substantially maximum power, without reflection of waves back toward the antenna. Amplifier 29 has three main purposes. One is to raise the received signal level to obtain an improvement in signal to receiver noise ratio by reducing the relative effect of anode circuit noise in heterodyne converter or detector 30. Another purpose is to reduce the probability of radiation from heterodyne oscillator 31 reaching other receivers and a third purpose is to protect the receiver converter 30 from the effects of interference from signals or noise far removed in frequency from the frequency of the desired signal.

Amplified signal output from amplifier 29 is combined with power from heterodyne oscillator 31 in the input to converter 30 as a result of which the power currents beat together to provide output at an intermediate or lower frequency which is supplied to intermediate frequency (I. F.) amplifier 32. I have shown only one stage of amplification in 32 but it should be understood that a number of stages may be used. The amplifier 32 with its one or more stages, raises the signal to a relatively high level and limits the band of frequencies passed through it to a band only wide enough to pass the signal pulses plus some additional band width to allow for mistuning and frequency drift between transmitter and receiver.

Output from I. F. amplifier 32 is delivered to pulse rectifier 33 where the I. F. carrier current pulses are converted into direct or unidirectional current. The pulse rectifier has two diodes in series which are so thresholded, or biased that no current flows in either diode until output from I. F. amplifier 32 rises above the effective receiver noise level. In practice I would expect to adjust the bias so that relatively few or no noise peaks are rectified. Thus receiver noise will have substantially no effect in the absence of received pulses.

However, when currents above the peak noise livel appear in the output of amplifier 32 the upper one of the two diodes passes rectified current and changes the control electrode potential of coupling amplifier 33*a*. Thus, signal pulses higher than the peaks of noise cause coupling amplifier 33*a* to pass on rectified or direct current pulses from its output to pulse demodulator 34.

If now the pulse power increases to a value much greater than twice the peak value of receiver noise, the lower of the two diodes in 33 and the control electrode in coupling tube 33*a* begin to pass current and to limit the peak pulse potential passed on by coupling amplifier 33*a*. Thus, so long as the signal pulses substantially exceed twice the peak amplitude of noise in the output of I. F. amplifier 32, the amplitude of pulses delivered to demodulator 34 is substantially constant and almost free from the effect of noise except on the ends of the pulses.

A portion of the pulse output from rectifiers 33 is delivered to pulse selector unit 37. Pulse selector 37 is the right hand half of a vacuum tube, which passes a pulse of current to discharge condenser 38*c* at each pulse delivered to it. Between pulses condenser 38*c* charges at a more or less steady rate through series resistance R and consequently the potential across condenser 38*c* follows a sawtooth wave type of variation with respect to time, being discharged down to a low value at each pulse received. The maximum peak potential across condenser 38*c* is approximately proportional to the time interval between pulses. Consequently, if a pulse is missing from a series of pulses the condenser can charge up to a potential twice as high as before, assuming that the pulses are uniformly spaced.

In the present case, when the potential across 38*c* has risen to some value greater than the value which can be reached if no pulses are missing, the cut-off potential of the left hand half 38*d* of the dual tube shown will be exceeded and this half of the tube will pulse itself due to the pulse transformer coupling from anode to control electrode circuits, thereby discharging condenser 38*c*. At the same time a pulse of potential will be delivered to pulse delayer channel selector 39, flipping it over to its temporarily stable condition, from which it will flip itself back after an adjustable time interval.

Pulse oscillator 38 then pulses at a rate of 25,000 pulses per second in synchronism with the repetition of the missing pulse period of the transmitter system. Preferably oscillator 38 is adjusted so that, by itself, under the conditions of operation, it will pulse at a rate only slightly less than 25,000 per second and the effect of the missing pulse, through pulse selector 37 will be not too much greater than is required to bring the oscillator into synchronism. This will minimize effect of transmitter modulation upon the timing of the pulses of oscillator 38, which should not be capable of responding to the synchronizing force of selector 37 except at a rate less than the lowest modulation frequency.

Pulse output from unit 38, synchronized by the missing pulse illustrated in Fig. 2 is now passed through a manually adjustable pulse delayer 39. This is a type of multivibrator or flip-flop circuit combination which tends to remain permanently unbalanced in one direction until the balance is thrown to the other direction by pulses from unit 38. After being thrown to the temporarily unbalanced direction or condition by the pulses from unit 38, the circuit 39 will restore itself suddenly to the normal direction or condition after a time delay which is adjustable by adjusting the circuit constants. This adjustment is to be made by the operator, either by switching circuit elements in and out which have been preadjusted, or by rotating a dial which changes the circuit constants. This time delay adjustment is the operator's means for selecting or "tuning in" any one of the four transmitters to the exclusion of the others.

When circuit 39 restores itself to its normal condition, it pulses a similar circuit 39*a* the function of which is to produce square wave impulses of a length corresponding to the time periods assigned to each transmitter, in this case about 8 microseconds as illustrated in Fig. 3. This is accomplished by letting short pulses from unit 39 throw the unbalance of circuit 39*a* from the permanently (i. e. normal) to the temporarily unbalanced condition and then adjusting the circuit constants of 39*a* until it automatically restores or throws itself back again after the desired 8 microsecond time interval.

While unit 39*a* is in its temporarily unbalanced condition it renders coupling tube amplifier 33*a* operative so that it will pass any pulses arriving during the selected 8 microsecond time periods but reject or block all other pulses. Thus I deliver to demodulator 34 only those pulses produced by a selected one of the four transmitters of Fig. 5.

At the same time, the beginning of the rectangular wave pulse from 39a into 33a throws the balance of demodulator circuit 34 in one direction where it remains until a signal pulse from 33a throws it back again. Since the timing of the signal pulse is varied by modulation it follows that the percentage of time spent by demodulator circuit 34 in one unbalanced condition or the other is modulated so that the average currents to the two anodes of the vacuum tube of demodulator 34 are differentially modulated. This produces modulation frequency output current which is delivered to audio amplifier 35 output from which operates the loudspeaker of the receiver.

In the operation of Fig. 8 in more detail, square wave pulse oscillator 39a delivers a relatively positive square wave of potential to a control electrode of coupling tube amplifier 33a throughout the 8 microsecond time periods assigned to reception of a particular transmitter. This positive square wave of potential cannot reach the circuits of demodulator 34 because of the condenser shown in the coupling lead from oscillator 39a to demodulator 34. However, the beginning of the positive potential delivered to 33a does cause a short positive pulse of potential to be delivered to demodulator 34 and this short pulse throws the balance of the flip-flop circuits of 34 to a condition such that the left anode, as seen in Fig. 8, carries current and the right anode none.

Now, if a signal pulse comes into the receiver, it will cause the rectifiers 33 to deliver a positive pulse of potential to a control electrode of coupling tube amplifier 33a causing it to pass a pulse of anode current. The pulse of anode current will result in a relatively negative pulse of potential on the anode and this negative pulse is delivered through a coupling condenser to demodulator 34. This causes the flip-flop circuit of demodulator 34 to reverse its unbalanced condition so that the right anode will carry current and the left anode will have zero current. This last unbalanced condition will continue until the oscillator 39a delivers a pulse to demodulator 34 of a polarity to throw the balance again. Before this happens, oscillator 39a will have delivered a negative pulse to demodulator 34, at the end of the square wave potential wave delivered to coupling tube amplifier 33a but this negative pulse will have no effect on the demodulator because the negative signal pulse already will have thrown the balance.

Thus, the beginnings of square wave pulses from synchronized oscillator 39a throw the balance of demodulator 34 in one direction at constant time intervals and, in between, the signal pulses throw the balance back. The signal pulses, although they are repeated at the same average rate as the pulses from 39a, are modulated in timing by the input to the transmitter which is being received. Therefore the time interval after oscillator 39a throws the balance of 34 before the signal pulse throws the balance back, is modulated. As a consequence, the average currents to the two anodes of demodulator 34 are varied or modulated differentially, in accordance with the useful modulation.

The average currents, after filtering to remove higher frequency components of variation, contain a differential A.-C. component of current which is the useful modulation current and this is amplified in audio amplifier 35 to drive the loudspeaker.

If desired, for best possible results, the oscillator 38 may be synchronized by pulse selector 37 through a long time constant synchronizing system of the kind described by Wendt and Fredendall in an article entitled, "Automatic frequency and phase control of synchronization in television receivers," Proccedings, The Institute of Radio Engineers, vol. 31, No. 1, January 1943.

Another alternative scheme of operation is to operate the transmitter next preceding the blank space of Fig. 2 normally without modulation so that its pulses, followed by the blank space, more or less rigidly control the frequency and timing of oscillator 38. In this case, when the pulses of this normally unmodulated transmitter are modulated the modulation will be heard in all the receivers adjusted to reception of the other transmitters. Such a scheme of operation reserves the one transmitter for synchronizing and for the transmission of very important information which should be heard by all listeners. In war time, for example, it may be utilized for air raid warning or for other purposes of an urgent nature which must reach a maximum number of people.

I claim:

1. In a radio receiver pulse selective circuit comprising a detector for converting an alternating current wave to a direct current wave, first and second electron discharge device electrode structures each having an anode and a grid, said first electrode structure comprising a pulse selective circuit, said second electrode structure comprising a pulse oscillator a connection from the anode of said first structure through a series arranged resistor to the positive terminal of a source of unidirectional potential, a connection from the anode of the second structure through a coil to a point on said resistor removed from said first anode, a condenser connected between said point and a point of reference potential, a coil connected between the grid of said second structure and said point of reference potential and coupled to said first coil, and a connection from the grid of said first structure to the output of said detector, and a pulse responsive circuit coupled to and controlled by said pulse oscillator.

2. A pulse receiving system including a heterodyne detector, an intermediate frequency amplifier, a rectifying detector coupled to the output of said amplifier, said last detector having a pair of serially arranged thresholding and limiting rectifiers, a keying amplifier coupled to the junction of said pair of serially arranged rectifiers, a pulse timing demodulator coupled to the output of said keying amplifier, and a synchronizing system coupled between the input and output of said keying amplifier, said synchronizing system including an oscillator comprising first and second electron discharge device electrode structures each having an anode and a grid, a connection from the anode of said first structure through a series arranged resistor to the positive terminal of a source of unidirectional potential, a connection from the anode of the second structure through a coil to a point on said resistor removed from said first anode, a condenser connected between said point and a point of reference potential, a coil connected between the grid of said second structure and said point of reference potential and coupled to said first coil, and a connection from the grid of said first structure to the output of said rectifying detector, and a utilization circuit coupled to the output of said demodulator.

3. A pulse receiving system including a heterodyne detector, an intermediate frequency amplifier, a rectifying thresholding and limiting detector coupled to the output of said amplifier, a keying amplifier coupled to said rectifying detector, a demodulator coupled to the output of said keying amplifier, and a synchronizing system coupled between the input and output of said keying amplifier, said synchronizing system including an oscillator comprising first and second electrode structures each having an anode and a grid, a connection from the anode of said first structure through a direct current impedance to a terminal adapted to be connected to a source of unidirectional potential, a connection from the anode of the second structure through a coil to a point on said impedance removed from said first anode, a condenser connected between said point and a point of reference potential, a coil connected between the grid of said second structure and said point of reference potential and coupled to said first coil, and a connection from the grid of said first structure to the output of said rectifying detector, and a utilization circuit coupled to the output of said demodulator.

4. In a receiver for the reception of signals transmitted in the form of short carrier wave pulses modulated in time or phase, means to derive a wave varying in accordance with the signals transmitted, a rectifying element coupled to said means to produce direct current pulses corresponding to the signals transmitted, a gating circuit coupled to said rectifying element, a pulse demodulating circuit, a differentiating circuit coupling said gating circuit to said demodulating circuit, a timing control circuit coupled to said rectifying element to develop a potential of square waveform having positive cycle portions of duration at least equal to the time or phase range of modulation of said pulses, a connection from said control circuit to said gating circuit to apply said square wave potential thereto to pass said direct current pulses to said differentiating circuit to derive negative pulses from said direct current pulses, a differentiator circuit connected between said control circuit and said demodulating circuit to produce timing pulses at the transitions of said square wave and apply said timing pulses to said demodulating circuit, whereby the differentiated pulses applied to said demodulating circuit reproduce the modulation at the output thereof.

5. In a receiver for the reception of signals transmitted in the form of short carrier wave pulses modulated in time or phase, means to produce direct current pulses corresponding to the signals transmitted, a gating circuit coupled to said means, a pulse demodulating circuit, a differentiator circuit coupling said gating circuit to said demodulating circuit, a gating and demodulating timing control circuit coupled to said means to develop a potential of square waveform, a connection from said control circuit to said gating circuit to apply said square wave potential thereto and derive signal pulses at the transition of said direct current pulses at the output of said differentiating circuit, a differentiator circuit connected between said control circuit and said demodulating circuit to derive timing pulses at the transitions of said square wave and apply said timing pulses to said demodulating circuit, whereby the derived pulses applied to said demodulating circuit reproduce the modulation at the output of said demodulating circuit.

6. In a receiver for selective reception of one channel of a plurality of channels conveying intelligence by way of trains of short carrier wave pulses modulated in time or phase, the pulses of said trains appearing one after the other in cyclic order with an interval between pulses at the end of each cycle twice that between pulses within the cycle, means to produce direct current pulses corresponding to the pulses transmitted, a normally closed gating circuit coupled to said means, a demodulating circuit, a channel selecting circuit coupled to said means to produce a gating pulse wave, said channel selecting circuit comprising a pulse oscillator coupled to said means to produce gating pulses only in the time interval between cycles of said direct current pulses, a pulse delay circuit coupled to said pulse oscillator to delay delivery of said pulses by time periods substantially equal to the intervals between pulses for selecting a desired one of said channels, and a pulse lengthener circuit coupled to said delay circuit to extend the duration of said gating pulses beyond the duration of said direct current pulses, a connection between said pulse lengthening circuit and said gating circuit to render the latter operative to pass the direct current pulses corresponding to the selected channel, a differentiating circuit coupling said pulse lengthening circuit to said demodulating circuit to derive timing pulses and apply the same to said demodulating circuit to initiate operation thereof, a differentiator circuit coupling said gating circuit to said demodulating circuit to derive signal pulses from the selected direct current pulses and apply the same to said demodulating circuit to terminate operation thereof, and an output circuit coupled to said demodulating circuit to reproduce the modulation currents of the selected channel.

7. In a receiver for reception of signals wherein a train of substantially regular spaced pulses sequentially representative of different sources of intelligence is transmitted followed by an interval during which no energy is transmitted for each cycle of operation, said interval being longer than the time between a pair of consecutive pulses in each cycle of the train, a control circuit including a pulse forming oscillator having a charge storing timing control element normally continuously charging to a value at which said oscillator is caused to pulse, a selector circuit to which said train of pulses is applied coupled to said control element and having means to retard the charging of said control element in response to each of the applied pulses of the train to permit said oscillator to pulse only during said interval, an adjustable delay circuit coupled to said pulse oscillator to delay delivery of the pulses from said oscillator to a time at which a given pulse is selected from each cycle of said train of pulses, and an adjustable pulse lengthening circuit coupled to said pulse delay circuit to extend the duration of the delayed pulses to provide an output pulse train for controlling the reception of a single given pulse from each cycle of said pair of transmitted pulses.

8. In a receiver for reception of signals wherein a train of substantially regular spaced pulses sequentially representative of different sources of intelligence is transmitted followed by an interval during which no energy is transmitted for each cycle of operation, said interval being longer than the time between a pair of consecutive pulses in each cycle of the train, a control circuit including a pulse forming oscillator having a capacitive timing control element normally charging to a value at which said oscillator is caused to pulse, a selector circuit to which said train of pulses is applied coupled to said oscillator and said control element to retard the charging of said control element in response to each of the applied pulses thereby to permit said oscillator to pulse only during said interval, an adjustable delay circuit comprising a monostable multivibrator coupled to said pulse oscillator to be triggered into the unstable state in response to pulses from said pulse oscillator and restored to the stable state at a time to select a given pulse from each cycle of said train of pulses, and an adjustable pulse lengthening circuit comprising a further monostable multivibrator coupled to said pulse delay circuit to be triggered to the unstable state upon restoration of said delay circuit to be restored to the stable state at desired later time to provide an output pulse train for controlling the reception of a single given pulse for each cycle of said train of transmitted pulses.

9. In a receiver for reception of signals wherein a train of substantially regular spaced pulses sequentially representative of different sources of intelligence is transmitted followed by an interval during which no energy is transmitted for each cycle of operation, said interval being longer than the time between a pair of consecutive pulses in each cycle of the train, a control circuit including an oscillator circuit having a capacitor incorporated therein normally subject to being charged to a value at which said oscillator is caused to pulse, a selector circuit to which said train of pulses is applied coupled to said capacitor to discharge the latter in response to each of the applied pulses thereby to permit said oscillator to pulse only during said interval, an adjustable delay circuit comprising a monostable multivibrator coupled to said pulse oscillator to be triggered into the unstable state in response to pulses from said pulse oscillator and restored to the stable state at a time to select a given pulse from each cycle of said train of pulses, to provide an output pulse train for controlling the reception of a single given pulse from each cycle of said train of transmitted pulses.

10. In a receiver for the reception of signals transmitted in the form of short carrier wave pulses modulated in time or phase, means to derive a wave varying in accordance with the signals transmitted, a rectifying element coupled to said means to produce direct current pulses corresponding to the signals transmitted, a gating circuit coupled to said rectifying element, a pulse demodulating circuit, a differentiating circuit coupling said gating circuit to said demodulating circuit, a gating and demodulating timing control circuit coupled to said rectifying element to develop a potential of square waveform, a connection from said control circuit to said gating circuit to apply said square wave potential thereto, a differentiator circuit connected between said control circuit and said demodulating circuit to produce timing pulses at the transitions of said square wave and apply said timing pulses to said demodulator circuit, said timing control circuit having constants at which said gating circuit is operative to pass said direct current pulses to said differentiator circuits and said demodulating circuit is operative to demodulate said direct current pulses substantially at the leading edge of said direct current pulses.

11. In a receiver for selective reception of one channel of a plurality of channels conveying intelligence by way of trains of short carrier wave pulses modulated in time or phase, the pulses of said trains appearing one after the other in cyclic order with an interval between pulses at the end of each cycle twice that between pulses within the cycle, means to produce direct current pulses corresponding to the pulses transmitted, a normally closed gating circuit coupled to said means, a demodulating circuit, a channel selecting circuit coupled to said means to produce a gating pulse wave, said channel selecting circuit comprising a pulse oscillator coupled to said means to produce gating pulses having a duration at least equal to that of said direct current pulses only in the time interval between cycles of said direct current pulses, and a pulse delay circuit coupled to said pulse oscillator to delay delivery of said pulses by time periods equal to the intervals between pulses for selecting a desired one of said channels a connection between said pulse delay circuit and said gating circuit to render the latter operative to pass the direct current pulses corresponding to the selected channel, a differentiating circuit coupling said pulse delay circuit to said demodulating circuit to derive timing pulses and apply the same to said demodulating circuit to initiate operation thereof, a differentiator circuit coupling said gating circuit to said demodulating circuit to derive signal pulses from the selected direct current pulses and apply the same to said demodulating circuit to terminate operation thereof, and an output circuit coupled to said demodulating circuit to reproduce the modulation currents of the selected channel.

12. In a receiver for reception of signals wherein a train of substantially regular spaced pulses sequentially representative of different sources of intelligence is transmitted followed by an interval during which no energy is transmitted for each cycle of operation, said interval being longer than the time between a pair of consecutive pulses in each cycle of the train, a control circuit including a blocking oscillator circuit incorporating a capacitor normally charging at a given rate to a value at which said oscillator is caused to pulse, a selector circuit to which said train of pulses is applied coupled to said control element to discharge the latter in response to each of the applied pulses and thereby permit said oscillator to pulse only during said interval, delay circuit comprising a monostable multivibrator coupled to said pulse oscillator to be triggered into the unstable state in response to pulses from said pulse oscillator and restored to the stable state after a time delay substantially equal to a selected multiple including unity of time periods between said regulator spaced pulses to select a desired pulse from each cycle of said train of pulses, an adjustable pulse lengthening circuit comprising a further monostable multivibrator coupled to said pulse delay circuit to be triggered to the unstable state upon restoration of said delay circuit to be restored to the stable state at desired later time to provide an output pulse train for controlling the reception of a single given pulse from each cycle of said train of transmitted pulses.

13. In a receiver for the reception of signals transmitted in the form of receiving cycles of short carrier wave pulses modulated in time or phase representative of different intelligence sources with a synchronizing interval between cycles, means to reproduce said signal pulses, a control circuit coupled to said means for producing a train of gating pulses, said means including a pulse forming oscillator arranged to pulse at a rate slightly less than the recurrence rate of pulses within each cycle, an oscillator blocking circuit coupled to said means to block said oscillator in response to each of said reproduced signal pulses thereby permitting said oscillator to pulse only during said interval, a time delay circuit coupled to said oscillator to delay delivery of the pulses from said oscillator to coincide with the time of occurrence of desired ones of said reproduced signal pulses, a gating circuit coupled to said means and said time delay circuit to pass only the desired reproduced signal pulses, a bistable multivibrator comprising two electron discharge systems each having cathode, grid and anode electrodes, one of said systems conducting and the other non-conducting in the absence of applied pulses, a utilization circuit differentially coupled to both of said anode electrodes, a differentiating circuit connecting said delay circuit to said one discharge system to render the same non-conducting and to render said other discharge system conducting on application of differentiated gating pulses, and a differentiator circuit connecting said gating circuit to said one discharge system to restore said multivibrator to the original state on applications of differentiated selected signal pulses, thereby to reproduce the modulation in said utilization circuit.

14. In a receiver for reception of signals wherein a train of substantially regular spaced time modulated pulses representative of different sources of intelligence is transmitted followed by an interval during which no energy is transmitted for each cycle of operation, said interval being longer than the time between a pair of consecutive regular spaced pulses in each cycle of the train, a control circuit including a pulse forming oscillator arranged to pulse at a rate slightly less than the rate of recurrence of said regular spaced pulses, an oscillator blocking circuit to which said train of pulses is applied coupled to said oscillator to block the same in response to each of the applied pulses and thereby permit said oscillator to pulse only during said interval, an adjustable delay circuit comprising a monostable multivibrator coupled to said pulse oscillator to be triggered into the unstable state in response to pulses from said pulse oscillator and restored to the stable state at a time to select a given pulse from each cycle of said train of pulses and to provide an output pulse train for controlling the reception of a single given pulse from each cycle of said train of transmitted pulses.

15. In a receiver for selective reception of one channel of a plurality of channels conveying intelligence by way of trains of short carrier wave pulses modulated in time or phase, the pulses of said trains appearing one after the other in cyclic order with an interval between pulses at the end of each cycle twice that between pulses within the cycle, means to produce direct current pulses corresponding to the pulses transmitted, a normally closed gating circuit coupled to said means, a demodulating circuit, a channel selecting circuit coupled to said means to produce a gating pulse wave, said channel selecting circuit comprising a pulse reproducing and delaying circuit coupled to said means to generate a train of gating pulses spaced at time intervals equal to that of one cycle of pulses and delayed with respect to said intervals between cycles to select a desired one of said channels and a pulse lengthener circuit coupled to said reproducing and delaying circuit to extend the duration of said gating pulses beyond the duration of said direct current pulses, a connection between said pulse lengthening circuit and said gating circuit to render the latter operative to pass the direct current pulses corresponding to the selected channel, a differentiating circuit coupling said pulse lengthening circuit to said demodulating circuit to derive timing pulses and apply the same to said demodulating circuit to initiate operation thereof, further means coupling said gating circuit to said demodulating circuit to derive signal pulses from said selected direct current pulses and apply the same to said demodulating circuit to terminate operation thereof, and an output circuit coupled to said demodulating circuit to reproduce the modulation currents of the selected channel.

16. In a receiver for selective reception of one channel of a plurality of channels conveying intelligence by way of trains of short carrier wave pulses modulated in time or phase, the pulses of sad trains appearing one after the other in cyclic order with an interval between pulses at the end of each cycle twice that between pulses within the cycle, means to produce direct current pulses corresponding to the pulses transmitted, a normally closed gating circuit coupled to said means, a demodulating circuit, a channel selecting circuit coupled to said means to produce a gating pulse wave, said channel selecting circuit comprising a pulse oscillator coupled to said means to produce a train of gating pulses having a duration at least equal to that of said direct current pulses and spaced apart by a time period equal to that of said cycle of pulses to select a desired one of said channels, a connection between said channel selecting circuit and said gating circuit to render the latter operative to pass the direct current pulses corresponding to the selected channel, a differentiating circuit coupling said connection to said demodulating circuit to derive timing pulses and apply the same to said demodulating circuit to initiate operation thereof, further means coupling said gating circuit to said demodulating circuit to derive signal pulses from said selected direct current pulses and apply the same to said demodulating circuit to terminate operation thereof, and an output circuit coupled to said demodulating circuit to reproduce the modulation currents of the selected channel.

17. In a receiver for the reception of signals transmitted in the form of short carrier wave signal pulses modulated in time or phase, means to reproduce said signal pulses, a differentiator circuit coupled to said means for deriving negative pulses corresponding to said signal pulses, a control circuit coupled to said means for producing positive timing pulses corresponding to unmodulated signal pulses, a bistable multivibrator comprising two electron discharge systems each having cathode, grid and anode electrodes, one of said systems conducting and the other non-conducting in the absence of applied pulses, a utilization circuit coupled to both of said discharge systems, said control circuit being connected to said one discharge system to render the same non-conducting and to render said other discharge system conducting on application of said positive timing pulses, and said differentiator circuit being connected to said one discharge system to restore said multivibrator to the original state on applications of said derived negative pulses, thereby to reproduce the modulation at said utilization circuit.

18. In a receiver for the reception of signals transmitted in the form of short carrier wave signal pulses modulated in time or phase, means to reproduce said signal pulses, a differentiator circuit coupled to said means for deriving negative pulses corresponding to said signal pulses, a control circuit coupled to said means for producing positive timing pulses corresponding to unmodulated signal pulses, a bistable multivibrator comprising two electron discharge systems each having cathode, grid and anode electrodes, one of said systems normally conducting and the other normally non-conducting, a utilization circuit differentially coupled to said anode electrodes, said control circuit being connected to the anode of said one discharge system to render the same non-conducting and to render said other discharge system conducting on application of said positive timing pulses, and said differentiator circuit being connected to the anode electrode of said one discharge system to restore said multivibrator to the normal state on applications of said derived negative pulses, thereby to reproduce the modulation currents in said utilization circuit.

CLARENCE W. HANSELL.

REFERENCES CITED

The following references are of record in the file of this patent:

UNITED STATES PATENTS

| Number | Name | Date |
|---|---|---|
| 2,254,031 | Faudell | Aug. 26, 1941 |
| 2,254,087 | Percival | Aug. 26, 1941 |
| 2,262,838 | Deloraine et al. | Nov. 18, 1941 |
| 2,361,437 | Trevor | Oct. 31, 1944 |
| 2,406,019 | Labin | Aug. 20, 1946 |

OTHER REFERENCES

The Interval Selector, Review of Scientific Instruments, vol. 12, February 1941, pages 71 to 76.